United States Patent
Goldberg et al.

(10) Patent No.: US 10,620,721 B2
(45) Date of Patent: Apr. 14, 2020

(54) POSITION-BASED LOCATION INDICATION AND DEVICE CONTROL

(71) Applicant: GOOGLE LLC, Mountain View, CA (US)

(72) Inventors: Steven Goldberg, Los Altos Hills, CA (US); Charles L. Chen, San Jose, CA (US); Stefan Welker, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 103 days.

(21) Appl. No.: 15/882,633

(22) Filed: Jan. 29, 2018

(65) Prior Publication Data

US 2019/0235641 A1    Aug. 1, 2019

(51) Int. Cl.
    *G06F 3/0346* (2013.01)
    *G06F 3/0482* (2013.01)
    (Continued)

(52) U.S. Cl.
    CPC ............ *G06F 3/0346* (2013.01); *G06F 3/012* (2013.01); *G06F 3/013* (2013.01); *G06F 3/0482* (2013.01);
    (Continued)

(58) Field of Classification Search
    CPC .... G06F 3/0346; G06F 3/0304; G06F 3/0308; G06F 3/0383; G06F 3/011; G06F 3/012;
    (Continued)

(56) References Cited

U.S. PATENT DOCUMENTS 9,477,302 B2 * 10/2016 Kauffmann ........... H04L 12/282
2004/0121725 A1 * 6/2004 Matsui ................... G08C 17/02
                                                          455/3.06

(Continued)

FOREIGN PATENT DOCUMENTS

| WO | 2016192916 A1 | 12/2016 |
| WO | 2017201162 A1 | 11/2017 |
| WO | 2018005061 A1 | 1/2018 |

OTHER PUBLICATIONS

International Search Report and Written Opinion for International Application No. PCT/US2019/014937, dated Jun. 21, 2019, 14 pages.

*Primary Examiner* — Tom V Sheng
(74) *Attorney, Agent, or Firm* — Brake Hughes Bellerman LLP

(57) ABSTRACT

Systems and methods for identifying locations and controlling devices are provided. For example, a user may indicate a location by aiming at the location from multiple positions in a physical space. The user may also identify a controllable device to control by aiming at the device. Example systems and methods include determining a first position within a three-dimensional space, receiving a first directional input, and determining a first ray based on the first position and first directional input. Example systems and methods also include determining a second position within the three-dimensional space, receiving a second directional input, and determining a second ray based on the second position and second directional input. Example systems and methods may also include identifying a location within a three-dimensional space based on the first ray and the second ray.

27 Claims, 11 Drawing Sheets

(51) Int. Cl.
  *G08C 21/00* (2006.01)
  *G08C 23/04* (2006.01)
(52) U.S. Cl.
  CPC .............. G06T 7/74 (2017.01); G08C 17/00 (2013.01); G08C 21/00 (2013.01); G08C 23/04 (2013.01); *G06T 2200/04* (2013.01); *G06T 2200/24* (2013.01); *G06T 2207/10028* (2013.01); *G08C 2201/32* (2013.01); *G08C 2201/50* (2013.01)
(58) Field of Classification Search
  CPC ........ G06F 3/013; G06F 3/048; G06F 3/0482; G06F 3/0484; G06T 7/74; G06T 2200/04; G06T 2200/24; G06T 2207/10028; G08C 17/00; G08C 2201/32; G08C 2201/50; G08C 2201/70; G08C 2201/71; G08C 21/00; G08C 23/04
  See application file for complete search history.

(56) References Cited

U.S. PATENT DOCUMENTS

| | | | |
|---|---|---|---|
| 2014/0249657 A1* | 9/2014 | Yurasits | G05B 15/02 700/90 |
| 2015/0070319 A1* | 3/2015 | Pryor | G06F 3/0425 345/175 |
| 2016/0252967 A1* | 9/2016 | Liang | H04L 12/282 345/156 |
| 2016/0283205 A1* | 9/2016 | Chen | G06F 3/0488 |
| 2016/0320934 A1* | 11/2016 | Thomason | G06F 16/951 |
| 2017/0162036 A1* | 6/2017 | Agardh | G08C 17/02 |
| 2018/0143432 A1* | 5/2018 | Li | G02B 27/0093 |
| 2018/0151060 A1* | 5/2018 | Griffin | H04N 5/4403 |
| 2018/0275762 A1* | 9/2018 | Freeman | G06F 3/017 |
| 2018/0322774 A1* | 11/2018 | Wang | G08C 17/02 |
| 2019/0235641 A1 | 8/2019 | Goldberg et al. | |

* cited by examiner

POSITION-BASED LOCATION INDICATION AND DEVICE CONTROL

BACKGROUND

Buildings, such as homes and offices, often include many devices that can be accessed and/or controlled remotely. For example, a thermostat may allow a user to access and adjust its settings via a computing device such as a smartphone. In some examples, the devices can be controlled via various types of wireless communication. For instance, some devices are controlled via instructions transmitted over WiFi or Bluetooth. Some devices may also be controlled via infrared signals.

SUMMARY

This disclosure describes systems and methods for position-based location indication and device control. For example, systems and techniques described herein may be used to indicate a location in a physical space, such as the location of a controllable device. Additionally, the systems and techniques may be used to identify a previously defined location in the physical space so as to control a device at that location.

One aspect is a non-transitory computer-readable storage medium comprising instructions stored thereon. The instructions are, when executed by at least one processor, configured to cause a computing system to receive a representation of a three-dimensional space, determine a first position and a first orientation of a computing device based on the representation of the three-dimensional space while the computing device is aimed at a target location in the three dimensional space, and determine a first ray within the representation of the three-dimensional space that extends from the first position of the computing device toward the target location based on the first position and first orientation of the computing device. The instructions are also, when executed by at least one processor, configured to cause the computing system to determine a second position and a second orientation of the computing device based on the representation of the three-dimensional space while the computing device is aimed at the target location, and determine a second ray within the representation of the three-dimensional space that extends from the second position of the computing device toward the target location based on the second position and second orientation of the computing device. The instructions are also, when executed by at least one processor, configured to cause the computing system to determine coordinates of the target location within the three-dimensional space based on the first ray and the second ray, and update the representation of the three dimensional space to include the target location.

Another aspect is a computing device that includes at least one processor and memory storing instructions. The instructions, when executed by the at least one processor, cause the computing device to receive a representation of a three-dimensional space and determine a position and an orientation of the computing device within the three-dimensional space while the computing device is aimed at a controllable device. The instructions also cause the computing device to identify the controllable device based on the position, the orientation, and the representation; generate a user interface for interacting with the identified controllable device; and responsive to receiving a user input via the user interface, transmit a command to the controllable device based on the received user input.

Yet another aspect is a method that includes receiving a representation of a three-dimensional space, and determining, by a computing device, a first position within the three-dimensional space. The method also includes receiving, by the computing device, a first directional input that indicates a direction from the first position to a target location, and determining a first ray within the representation of the three-dimensional space that extends from the first position toward the target location based on the first directional input. The method further includes determining, a second position within the three-dimensional space, receiving a second directional input that indicates a direction from the second position to the target location, and determining a second ray within the representation of the three-dimensional space that extends from the second position toward the target location based on the second directional input. The method also includes determining coordinates of the target location within the three-dimensional space based on the first ray and the second ray.

The details of one or more implementations are set forth in the accompanying drawings and the description below. Other features will be apparent from the description and drawings, and from the claims.

DETAILED DESCRIPTION

Figure 1:
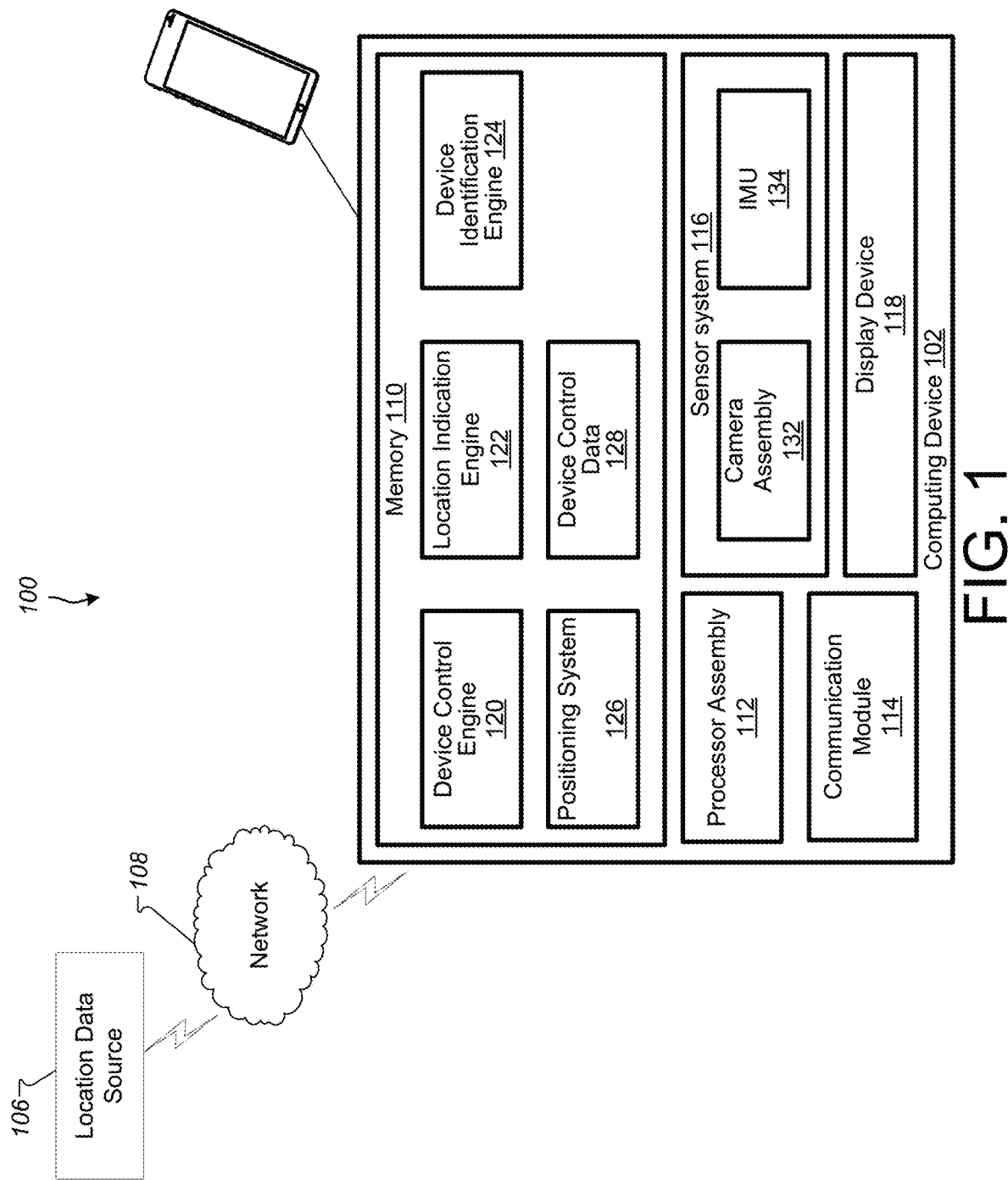
FIG. 1 is a block diagram illustrating a system according to an example implementation.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

The present disclosure describes technological improvements that simplify the identification and control of devices within a physical space, such a building.

The number of devices that can be controlled remotely within a building has been increasing rapidly. Some examples of controllable devices include lights, switches, outlets, thermostats, badge readers, fire or other environmental alarms, blinds, entertainment devices such as televisions, stereos, media player, and computing equipment such as wireless network access points, printers, scanners, and copiers. In some situations, a building may have multiple of the same type of controllable device. For example, an office building could have hundreds or thousands of identical or nearly identical controllable light bulbs. A user may wish to access, control, or otherwise communicate with a target controllable device using, for example, a smartphone. But, in these situations, it may be difficult for the user to identify the target device among the many available.

In a conventional process, a user may initially place icons representing controllable devices on a two-dimensional floor plan that represents a building. The user can use the two-dimensional floor plan to select the target controllable device. However, the initial setup of the floor plan may be tedious, time-consuming, and inaccurate. Furthermore, after the initial setups, users may find it challenging to identify a target device using the two-dimensional floor plan when icons representing multiple devices are close to each other on the two-dimensional floor plan. Additionally, the two-dimensional floor plan does not scale well to three-dimensional spaces as controllable devices may be located at similar two-dimensional locations on different floors or even on the same floor but at different vertical positions.

In at least some implementations, a user may identify the location of controllable devices on a three-dimensional representation (or map layer) of a building by aiming at the controllable device from a first location, moving to a second location, and aiming at the controllable device again from the second location. The second location may, for example, be laterally offset from the first location. In some implementations, the system uses more than two locations to determine the location of the controllable device. Using more than two locations may, for example, increase the precision with which the location can be determined.

In some implementations, the user aims at the controllable device by aiming a computing device at the controllable device. For example, aiming the computing device at the controllable device may include orienting the computing device in a specific way with respect to the controllable device (or target location). In some implementations, the user aims at the controllable device by physically targeting (e.g., aiming, pointing, orientating) at least a portion of a mobile computing device (e.g., a smartphone or tablet) at the controllable device. For example, a user may aim at a controllable device by physically pointing the top of a computing device at the controllable device (e.g., like the computing device was a remote control). In some implementations, the user aims at a controllable device by physically aiming a camera lens of a mobile computing device, which may be located on a back panel of the computing device, at the controllable device. Aiming the computing device at the controllable device may include aiming the computing device at the controllable device without emitting a signal directed to the controllable device (i.e., the computing device does not emit an IR signal or laser signal).

When the user is aiming at the controllable device, the mobile computing device determines a coordinate corresponding to the location and a direction. For example, the position may be determined using a visual positioning module of the mobile computing device and the direction may be determined based on an orientation of the mobile computing device as determined using the visual positioning module or as measured using, for example, an inertial motion unit. Some implementations include a head-mounted display device and the user may aim at the device by looking at the controllable device. Some implementations may also include a hand-tracking module, and the user may aim at the controllable device by gesturing (e.g., pointing) at the controllable device.

Although many of the examples described herein use a visual positioning system to determine a position and orientation of the computing device, other implementations may use other types of position and orientation technologies. Implementations are possible using other types of 6 degree of freedom (6-dof) localization systems that provide 6-dof poses of a computing device.

The computing device may determine target coordinates associated with the location of the target device based on the user's aim from the first location and the second location. For example, the computing device may generate a first ray in a three-dimensional representation of the space based on the determined coordinate and direction. Generating the ray, may, for example, include determining an equation that represents the ray in the representation of the space. In some implementations, the ray includes or is represented by a vector and/or one or more coordinates. For example, the ray may emanate from the determined coordinate in the determined direction. The ray may also be represented as a line or line segment. The computing device may generate a second ray in the three-dimensional representation in a similar manner. The computing device may then determine the target coordinates by, for example, identifying a coordinated based on the closest points between the first and second ray. In some cases, the rays may intersect and the intersection point is used to determine the target coordinates. In other cases, the rays may not actually intersect and a midpoint between the nearest points on each of the rays may be used to determine the target coordinates. When the target coordinates are determined, the user may then enter information about the target device, such as selecting a device type, providing a name, and setting access/permissions for controlling the device. The computing device may then store (e.g., locally or on a remote server) information associated with the controllable device, including the determined coordinates. In some implementations, the computing device may also establish an intersection volume associated with the controllable device. The size and shape of the intersection volume may be based on properties of the controllable device. In some implementations, the size and shape of the intersection volume may be determined based on how close the rays were to intersecting (e.g., when the rays are further apart, the volume is larger).

Later, a user may aim at a controllable device that has previously been added to the three-dimensional representation of the physical space to call up an interface to control the device. For example, a computing device may generate a ray based on a location and direction determined while the user is aiming at the controllable device. The computing device may then evaluate the ray against the coordinates and/or intersection volumes associated with controllable devices in the three-dimensional representation of the physical space. If the ray intersects one of the intersection volumes or passes near the coordinates, the interface controlling the associated controllable device may be displayed. If the ray is directed toward multiple controllable devices, a selection interface may be displayed to allow the user to select the desired target device. The controllable devices may be listed on the selection interface in an order determined based on distance from the user.

Although many of the examples described herein relate to orienting a smartphone toward a controllable device and controlling the device using a user interface displayed by the smartphone, alternatives are possible. For instance, some implementations include an augmented reality (AR) system in which a user wears a head-mounted display that can overlay content on the user's field of view. In these implementations, the user may aim at a controllable device using a hand gesture, a head orientation, or even a gaze. The user interface to control an identified device may then be overlaid on the user's field of view.

FIG. 1 is a block diagram illustrating a system 100 according to an example implementation. The system 100 for position-based location indication and device control. In some implementations, the system 100 includes a computing device 102 and a location data source 106. Also shown is a network 108 over which the computing device 102 may communicate with the location data source 106.

The computing device 102 may include a memory 110, a processor assembly 112, a communication module 114, a sensor system 116, and a display device 118. The memory 110 may include a device control engine 120, location indication engine 122, a device identification engine 124, a positioning system 126, and device control data 128. In some implementations, the computing device 102 is a mobile device (e.g., a smartphone).

The sensor system 116 may include various sensors, such as a camera assembly 132. Implementations of the sensor system 116 may also include other sensors, including, for example, an inertial motion unit (IMU) 134, a light sensor, an audio sensor, an image sensor, a distance and/or proximity sensor, a contact sensor such as a capacitive sensor, a timer, and/or other sensors and/or different combination(s) of sensors. In some implementations, the positioning system 126 may use the sensor system 116 to determine a location and orientation of the computing device 102 within a physical space and/or to recognize features or objects within the physical space.

The camera assembly 132 captures images and/or videos of the physical space around the computing device 102. The camera assembly 132 may include one or more cameras. The camera assembly 132 may also include an infrared camera. Images captured with the camera assembly 132 may be used to determine a location and orientation of the computing device 102 within a physical space, such as an interior space, based on a representation of that physical space that is received from the memory 110 or an external computing device such as the location data source 106. In some implementations, the representation of a physical space may include visual features of the physical space (e.g., features extracted from images of the physical space). The representation may also include location-determination data associated with those features that can be used by a visual positioning system to determine location and/or position within the physical space based on one or more images of the physical space. The representation may also include a three-dimensional model of at least some structures within the physical space. In some implementations, the representation does not include three-dimensional models of the physical space.

In some implementations, the computing device 102 may include a visual positioning system that compares images captured by the camera assembly 132 (or features extracted from those images) to a known arrangement of features within the representation of the physical space to determine the 6-dof pose (e.g., the location and orientation) of the computing device 102 within the physical space.

The device control engine 120 allows a user to control devices in a physical space such as a building by aiming at the device. For example, when the user aims at a device, the device control engine 120 may use the device identification engine 124 to identify the device at which the user is aiming. For example, the device identification engine 124 may identify the controllable device based on the direction the user is aiming and a location of the computing device 102 as determined using the positioning system 126. The device identification engine 124 may project a ray from the determined location in the direction in a representation of the physical space and then determine whether the ray identifies any controllable devices in the representations. In some implementations, controllable devices are associated with an intersection volume in the representation and a controllable device is identified when the ray intersects with the controllable device's associated intersection volume.

The device control data 128 may include coordinates and/or intersection volumes associated with controllable devices. The device control data 128 may also store user interfaces, command protocols for controlling and interacting with the controllable devices, and other information about the controllable devices (e.g., type information, names, notes, access control properties, etc.). In some implementations, the coordinates and/or intersection volumes are generated using the location indication engine 122. For example, the location of a controllable device may be indicated by a user aiming at the controllable device from multiple locations within the physical space. In some implementations, the coordinates and/or intersection volumes are retrieved from the location data source 106, which may store information about controllable devices provided by multiple users.

The positioning system 126 determines a position of the computing device 102 within a physical space. In some implementations, the position system 126 includes a visual positioning system that determines a 6-dof pose of the computing device 102 within a physical space by capturing images of the physical space, extracting features from those images, and comparing those images and/or features to features in a representation of the physical space.

In some implementations, the device control engine 120, the location indication engine 122, device identification engine 124, and positioning system may include instructions stored in the memory 110 that, when executed by the processor assembly 112, cause the processor assembly 112 to perform operations described herein to indicate locations and interact with devices based on locations. The device control data 128 may include data stored in memory and, in at least some implementations, instructions that, when executed by the processor assembly 112, cause the processor assembly 112 to display user interfaces and issue commands to interact with various control devices.

The device control engine 120 and the location indication engine 122 may cause the display device 118 to generate a user interface based on input received from the camera assembly 132, the IMU 134, and/or other components of the sensor system 116. For example, the IMU 134 may detect motion, movement, and/or acceleration of the computing device 102 and/or an associated HMD. The IMU 134 may include various different types of sensors such as, for example, an accelerometer, a gyroscope, a magnetometer, and other such sensors. An orientation of the computing device 102 (or an associated HMD) may be detected and tracked based on data provided by the position system 126 and/or sensors included in the IMU 134. The detected orientation of the computing device 102 (or an associated HMD) may allow the system to in turn, determine a direction in which the user is aiming. Based on the detected orientation, the device control engine 120 may use the device identification engine 124 to determine a controllable device at which the user is aiming and generate an associated user interface for interacting with the controllable device. In some implementations, the location indication engine 122 may use the determined direction to identify a location the user is pointing at in a representation of the physical space surrounding the user. In some implementations, identifying the location in three-dimensional space may require determining a direction the user is aiming multiple times from different positions within the physical space.

Although FIG. 1 does not show it, some implementations include an HMD. The HMD may be a separate device from the computing device 102 or the computing device 102 may include the HMD. In some implementations, the computing device 102 communicates with the HMD via a cable. For example, the computing device 102 may transmit video signals and/or audio signals to the HMD for display for the user, and the HMD may transmit motion, position, and/or orientation information to the computing device 102.

The computing device 102 may also include various user input components (not shown) such as a controller that communicates with the computing device 102 using a wireless communications protocol. In some implementations, the computing device 102 may communicate via a wired connection (e.g., a Universal Serial Bus (USB) cable) or via a wireless communication protocol (e.g., any WiFi protocol, any BlueTooth protocol, Zigbee, etc.) with a head-mounted display (HMD) device (not shown). In some implementations, the computing device 102 is a component of the HMD and may be contained within a housing of the HMD.

The memory 110 can include one or more non-transitory computer-readable storage media. The memory 110 may store instructions and data that are usable by the computing device 102 to determine coordinates of a target location based on a position of the computing device 102 and/or to identify a target controllable device based on a user aiming at the target controllable device.

The processor assembly 112 includes one or more devices that are capable of executing instructions, such as instructions stored by the memory 110, to perform various tasks associated with position-based location indication and device control. For example, the processor assembly 112 may include a central processing unit (CPU) and/or a graphics processor unit (GPU). For example, if a GPU is present, some image/video rendering tasks, such as generating and displaying a user interface for a controllable device may be offloaded from the CPU to the GPU.

The communication module 114 includes one or more devices for communicating with other computing devices, such as the location data source 106. The communication module 114 may communicate via wireless or wired networks, such as the network 108.

The IMU 134 detects motion, movement, and/or acceleration of the computing device 102. The IMU 134 may include various different types of sensors such as, for example, an accelerometer, a gyroscope, a magnetometer, and other such sensors. A position and orientation of the computing device 102 may be detected and tracked based on data provided by the sensors included in the IMU 134. In some implementations, the IMU 134 is configured to detect a position and orientation of an HMD, which may allow the system to in turn, detect and track the user's gaze direction and head movement.

The network 108 may be the Internet, a local area network (LAN), a wireless local area network (WLAN), and/or any other network. A computing device 102, for example, may receive the audio/video signals, which may be provided as part of AR content in an illustrative example implementation, via the network.

Figure 2:
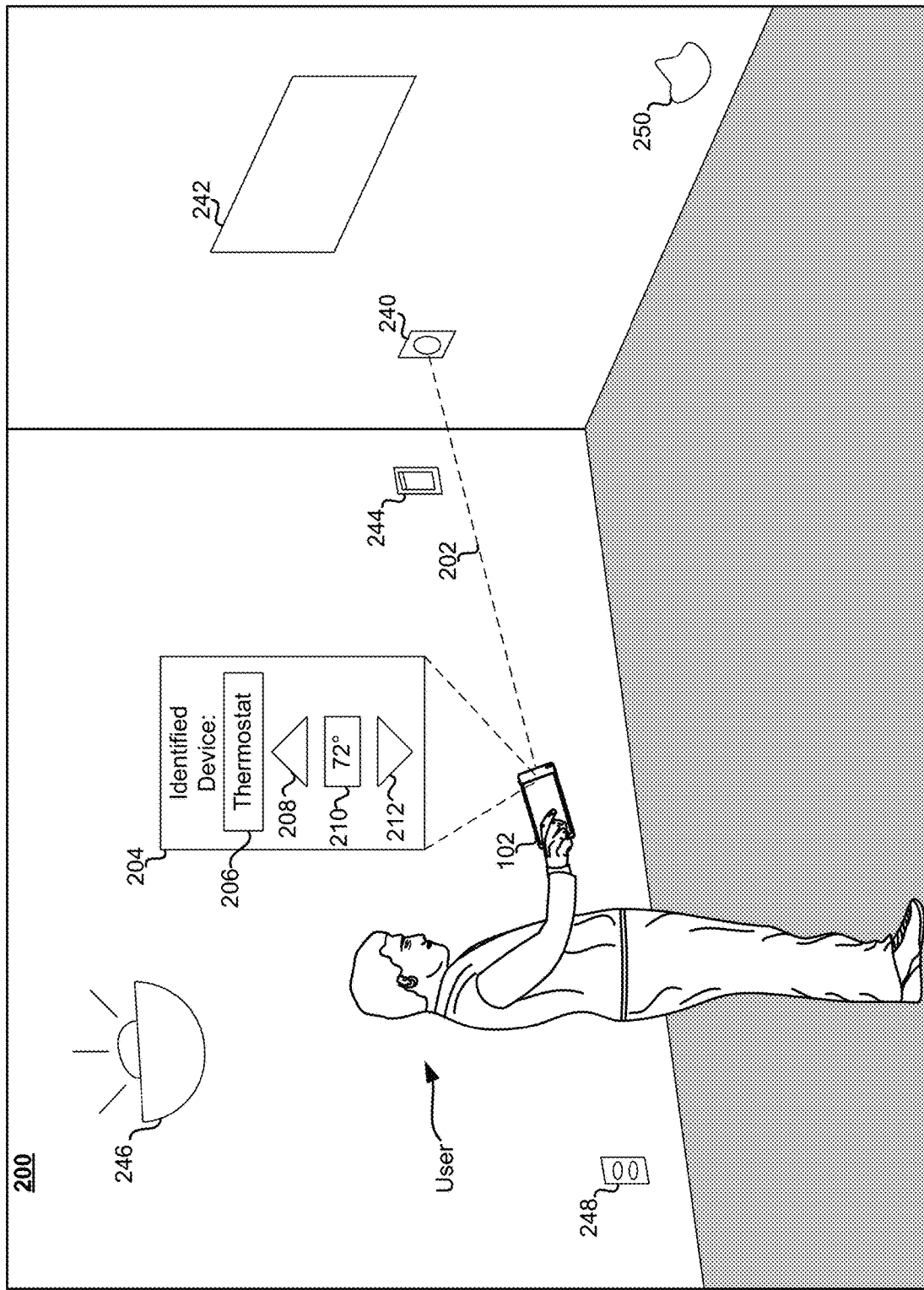
FIG. 2 is a third person view of an example physical space in which a user is interacting with a controllable device based on aiming the computing device of FIG. 1 at the controllable device.

FIG. 2 is a third person view of an example physical space 200 in which a user is interacting with a controllable device 240 based on aiming the computing device 102 at the controllable device 240. In this example, the user is aiming the top edge of the computing device 102 at the controllable device 240. In other implementations, the user may aim the computing device 102 at the controllable device 240 differently (e.g., such as by aiming a camera of the computing device 102 at the controllable device 240). In some implementations, the user may aim at the device with a gesture, a head motion, or an eye motion. The computing device 102 then generates a ray 202 in the direction the user. The computing device compares the ray 202 to previously defined locations of controllable devices that are stored in a representation of the physical space 200 to identify that the user is aiming at the controllable device 240.

In this example, the controllable device 240 is a thermostat and the computing device 102 is displaying a user interface screen 204 for interacting with a thermostat. The user interface screen 204 is just an example and different implementations will include different elements. In some implementations, the user interface screen is generated based on the type of controllable device the user indicated by aiming. In this example, the user interface screen 204 includes an information field 206, an increase control element 208, a temperature field 210, and a decrease control element 212. The information field 206 may, for example, display information about the controllable device 240 such as a device type, a name, a location, and/or a note previously entered by a user. The temperature field 210 may display a current temperature sensed by the controllable device 240 and/or a current temperature setting of the controllable device 240. The increase control element 208 and the decrease control element 212 may be actuated to adjust a temperature setting of the controllable device 240.

In addition to the controllable device 240, the physical space 200 also includes controllable device 242, 244, 246, and 248. In this example, the controllable device 242 is an electric display device, the controllable device 244 is a switch, the controllable device 246 is a light, and the controllable device 248 is an outlet. The user may identify any of these controllable devices by aiming at one of them to access or control the controllable device. In response to the user aiming at one of the controllable device, the computing device 102 may generate a user interface that provides element specific to controlling the identified controllable device. The physical space 200 also includes a mark 250 on a wall. In some implementations, a user may indicate a location within the physical space. For example, a user may indicate the location of the mark 250 using the computing device 102 to for example, submit a maintenance request (e.g., to identify damage or spills within the physical space).

In some implementations, the user interface screen 204 is displayed to the user on a display device of the computing device 102. In some implementations, the user interface screen 204 may be overlaid on an image (or video feed being captured by the camera of the computing device) of the physical space so. Additionally, the user interface screen 204 may be displayed as AR content over the user's field of view using an HMD worn by the user.

Figure 3:
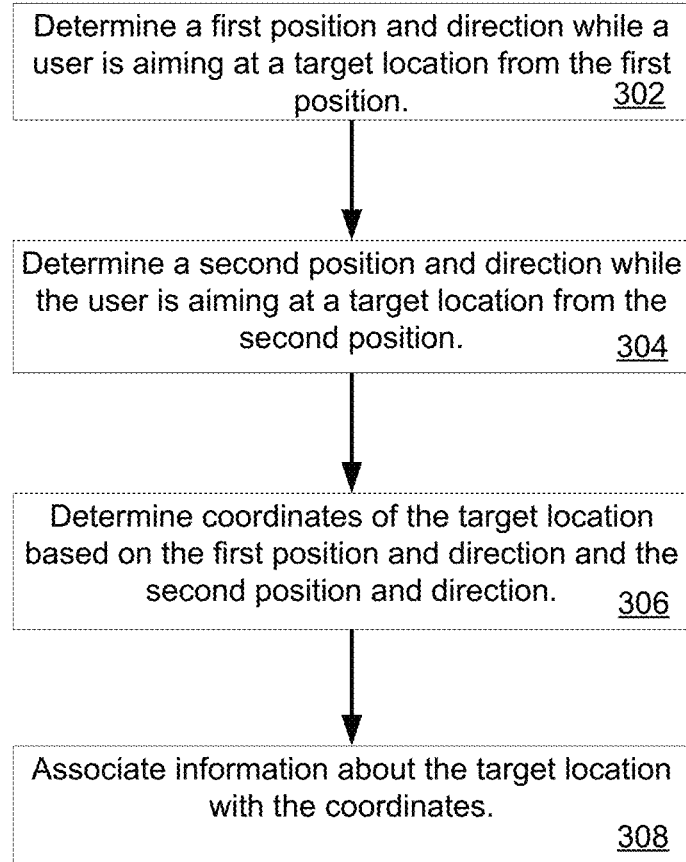
FIG. 3 is a diagram of an example method of identifying a location in a physical space that is indicated by a user, in accordance with implementations described herein.

FIG. 3 is a diagram of an example method 300 of identifying a location in a physical space that is indicated by a user, in accordance with implementations described herein. This method 300 may for example be performed by the location indication engine 122 of the computing device 102 to allow a user to indicate one or more locations, such as locations of controllable devices, within a physical space.

Figure 5A:
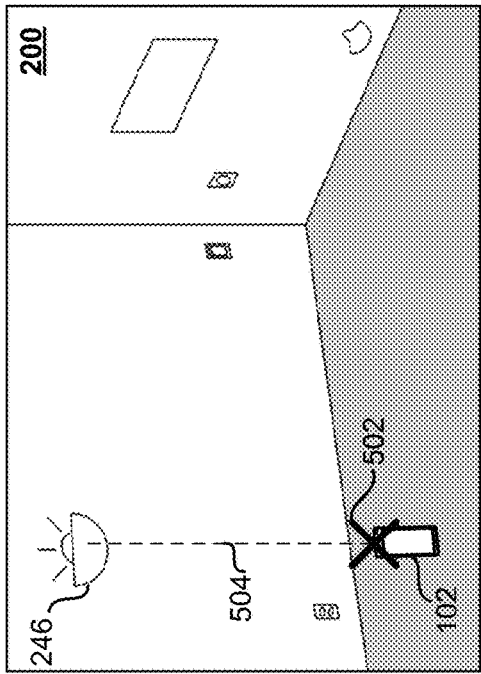
FIGS. 5A-5G are schematic diagrams of steps of identifying a location of a controllable device indicated by a user in accordance with implementations as described herein.

At operation 302, a first position and direction is determined while a user is aiming at a target location from the first position. In some implementations, the user aims at a target location by holding a mobile computing device, such as a smart phone, like a remote control and aiming the top of the device at the target location. When the user is aiming at the target location, the user may issue a command or otherwise indicate that the computing device should determine the first position and direction. For example, the user may press a physical button or actuate a virtual control on the computing device to indicate that the computing device is aimed at the target location. The user may also issue a spoken indication that the computing device is aimed at the target location. The computing device determines the position from which the user is aiming and the direction the user is aiming. For example, the computing device may use a visual position system to determine the position. In some implementations, the computing device may determine a position based on a global positioning system, triangulation using radio frequency signals emitted by beacons or other communication devices and/or dead reckoning technologies. The direction the user is aiming may be determined based on the orientation of the computing device as determined using a position system, such as a visual positioning system, and or an IMU. FIG. 5A shows an example of the computing device 102 disposed at a first position 502 in the physical space 200 and being aimed at the controllable device 246.

In some implementations, the computing device is configured so that the user aims by point a camera lens at the target locations. Images captured by the camera may be displayed on a display device of the computing device and a target marker may be overlaid on the displayed images. For example, the user can then aim at the target location by aligning the target marker with the target location on the display device. Some implementations include a hand tracker, and the user aims at a target location with a hand gesture (e.g., by pointing at the target location). Some implementations include a HMD, and the user aims at a target location by orienting his or her head toward the target location. Additionally, some embodiments include an eye tracker and users can aim at a target location by looking at the location.

Figure 5B:
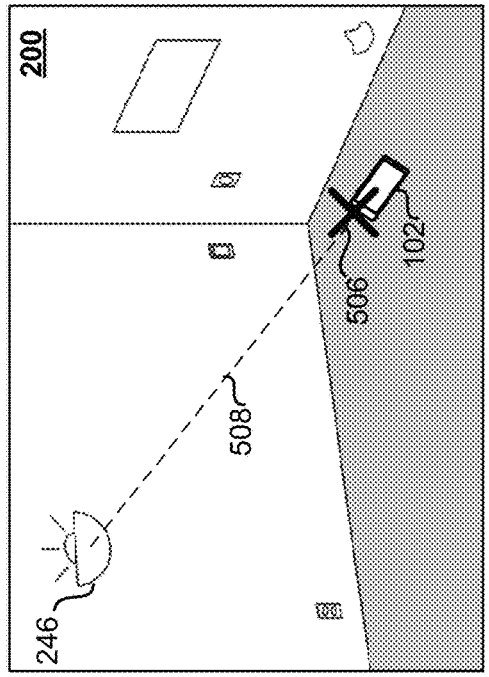

At operation 304, a second position and direction is determined while a user is aiming at a target location from the second position. Operation 304 may be similar to operation 302 except that the user has moved to the second position within the physical space. FIG. 5B shows an example of the computing device 102 disposed at a second position 506 in the physical space 200 and being aimed at the controllable device 246.

At operation 306, coordinates of the target location are determined based on the first position and direction and the second position and direction. In some implementations, a first ray extending from the first position in the first direction is compared to a second ray extending from the second position in the second direction. In some implementations, an intersection between the first ray and the second ray is calculated to identify a coordinate associated with the target location. The first ray and the second ray may not intersect. Instead, the nearest point on the first ray to the second ray and the nearest point on the second ray to the first ray may be identified. These nearest points may be used to identify a coordinate associated with the target location. For example, a midpoint between the nearest points may be used as the coordinates of the target location. In some implementations additional positions and directions are used in a similar manner to determine the target location. For example, a third position and direction can be determined while a user is aiming at a target location from the third position. A third ray extending from the third position in the third direction is compared to the first ray and the second ray. Using a third ray (or even more rays determined in a similar manner) may increase the precision of the location that is determined.

Figure 5C:
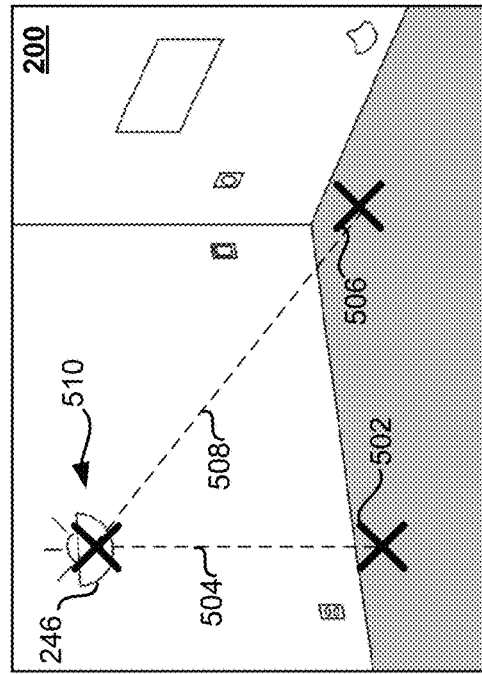

FIG. 5A shows an example of a first ray 504 extending from the first position 502 in the first direction to the controllable device 246 at the target location. FIG. 5B shows an example of a second ray 508 extending from the second position 506 in the second direction to the controllable device 246 at the target location. FIG. 5C shows an example of the first ray 504 and the second ray 508 being used to identify a coordinate 510 associated with the target location.

In some implementations, other geometric structures are used to determine coordinates of the target location. For example, some implementations may generate a first plane based on the first location and the first direction and a ray based on the second location and the second direction. The coordinates of the target location may then be determined based on the intersection of the first plane and the ray.

At operation 308, information about the target location is associated with the coordinates. For example, a user may provide information about the target location via a user interface generated by the computing device. Alternatively, the user may provide information as spoken input to the computing device. For example, the user may identify a type of controllable device that is at the target location. The user may also provide textual information such as a name, description, or notes about the target location. The information provided by the user can then be stored in association with the coordinates of the target location. This information may be stored locally on the computing device and/or transmitted to a server computing device (e.g., so that other computing devices may access the information associated with the target location too).

Additionally, in some implementations, the information also includes a size, shape, or volume that is associated with the target location. This information can later be used to determine whether the location is being aimed at.

Figure 4:
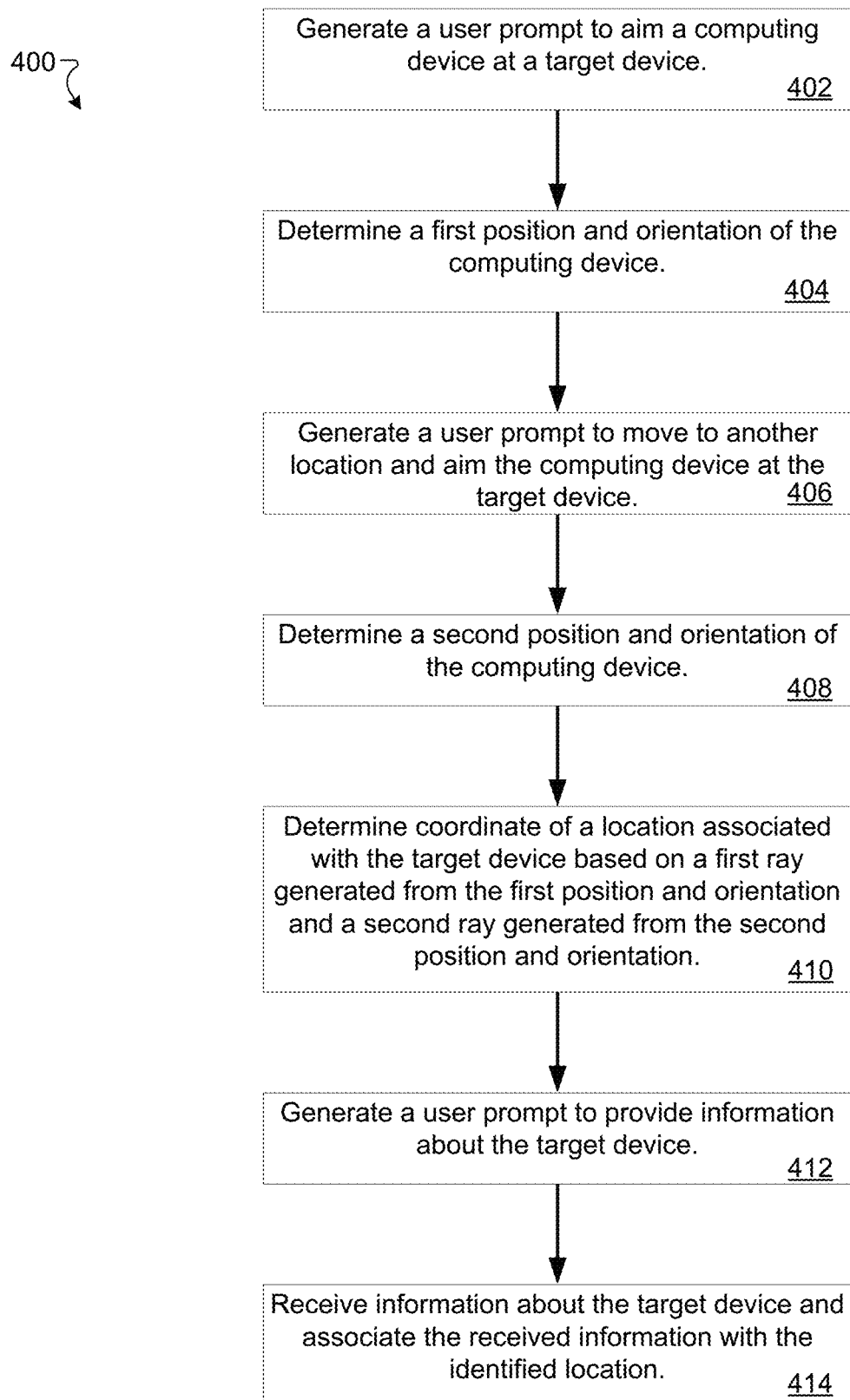
FIG. 4 is a diagram of an example method of identifying a location of a controllable device indicated by a user, in accordance with implementations described herein.

FIG. 4 is a diagram of an example method 400 of identifying a location of a controllable device indicated by a user, in accordance with implementations described herein. This method 400 may, for example, be performed by the location indication engine 122 of the computing device 102 to allow a user to indicate the locations of one or more controllable devices within a physical space so that users can control those devices as described herein. This method may be performed when a controllable device is installed within a physical space or at another time.

At operation 402, a user prompt is generated to direct a user to aim a computing device at a target controllable device. In some implementations, the user prompt includes visual instructions, which may include images and/or text, that are displayed on a display device of the computing device 102. The user prompt can also include audio signals.

At operation 404, a first position and orientation of the computing device is determined. In some implementations, the first position and orientation of the computing device is determined after receiving a user input indicating that the computing device is aimed at the target controllable device. As described previously, determining the position and orientation of the computing device, may including using a positioning system, such as a visual positioning system, and an IMU of the computing device.

At operation 406, a user prompt is generated to direct the user to move to another location and aim the computing device at the target controllable device. Like the user prompt generated in operation 402, this user prompt may include visual or audio components. In some implementations, the user prompt may direct the user to move in a particular direction or move a particular distance.

At operation 408, a second position and orientation of the computing device is determined. The second position and orientation may be determined in a manner similar to how the first position and orientation is determined at operation 404.

At operation 410, coordinates of a location associated with target device are determined based on a first ray generated from the first position and orientation and a second ray generated from the second position and orientation. Operation 410 may be similar to operation 306.

As described previously, FIG. 5A shows an example of the first ray 504 extending from the first position 502 in the first direction to a target device (i.e., the controllable device 246) and FIG. 5B shows an example of the second ray 508 extending from the second position 506 in the second direction to the target device. FIG. 5C shows an example of the first ray 504 and the second ray 508 being used to identify a coordinate 510 associated with the target device.

At operation 412, a user prompt is generated to direct the user to provide information about the target device. Like the user prompts generated in operations 402 and 406, this user prompt may include visual or audio components. In some implementations, the user prompt may direct the user to move in a particular direction or move a particular distance.

Figure 5D:
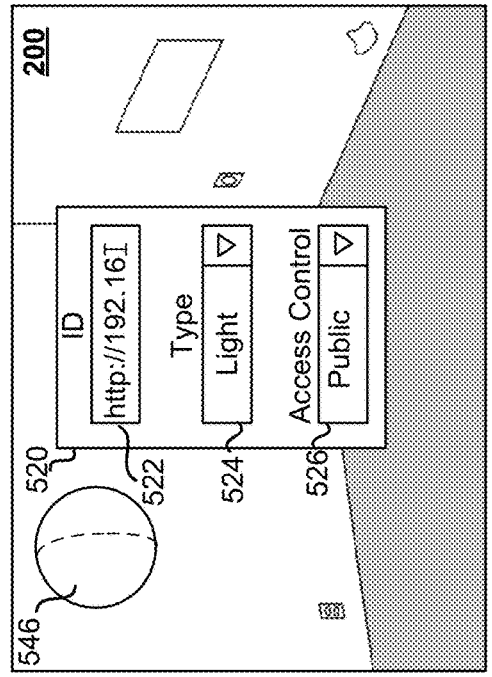

FIG. 5D shows an example user interface screen 520 that is displayed by some implementations to prompt the user to provide information about the target device. In this example, the user interface screen 520 includes an ID field 522, a type field 524, and an access control field 526. Other implementations may include different, fewer, or more fields. In some implementations, the ID field 522 is configured to received a universal resource locator that is usable to communicate with the controllable device, the type field 524 is a dropdown list populated with a list of different device types, and the access control field 526 is a dropdown list of different access control levels (e.g., public, private, administrators, etc.). In some implementations, the value selected/entered for the device type may be used to identify the functionality of the device, the commands used to interact with the device, and to select a user interface for interacting with device. Additionally, the device type value may be used to define a size and/or shape of an intersection volume for the controllable device. FIG. 5D shows an example intersection volume 546 for the controllable device 246. In this example, the intersection volume 546 has a spherical shape that surrounds the coordinate 510.

Although in this example, the ID field 522 is shown on the user interface screen 522, in some embodiments the ID of the device is entered by capturing an image of a barcode, QR code, or other type of visual identifier on the controllable device. Additionally, in some embodiments, the ID may be defined before the user aims at the controllable device. For example, a computing device may manage a process of adding one or more controllable devices to a representation of an environment. In this example, the computing device starts with an identifier of a controllable device and directs the user to indicate the location of the device. In an example process, the computing device would then cause a controllable device to blink a light or otherwise indicate that the user should aim at it (e.g., by sending a command to the device via a local area network). In some implementations, a computing device may direct a user to indicate the location of a sequence of controllable devices by sequential causing the devices to identify themselves. The user can then follow the sequence of identified devices and use the processes described herein to indicate the location of the devices.

In some implementations, the user interface screen 520 may display a dropdown list of controllable devices that can be accessed on a particular network (e.g., the values in the list may be searching the network for controllable devices or by querying a directory of known controllable devices in a building or network). In these implementations, the user may simply select the device from the dropdown list to specify all information needed to interact with the device.

At operation 414, information is received about the target device and associated with the determined location. The received information may for example be stored locally in association with the coordinates of the location. In this manner, the next time the computing device is aimed at the location the information can be retrieved and used to interact with the device. Alternatively, the information and coordinates of the location may be transmitted to a server device such as the location data source 106. The server device may, for example, store a directory of controllable devices and associated locations for a network or building. Multiple computing devices may then be able to query the server device to identify controllable devices and determine how to interact with the controllable devices.

Figure 5F:
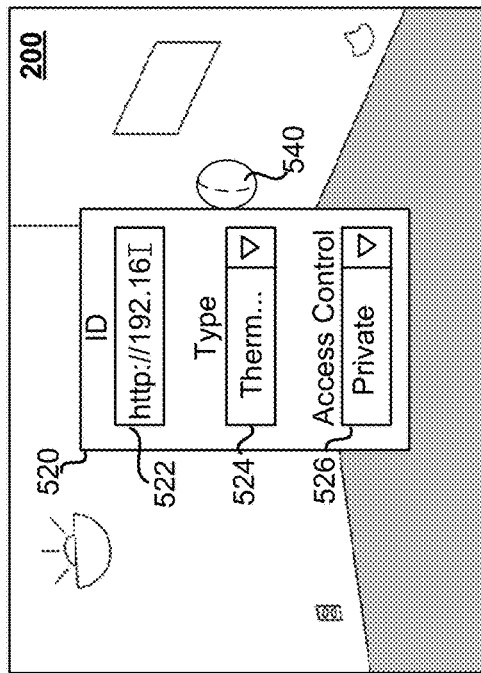
Figure 5E:
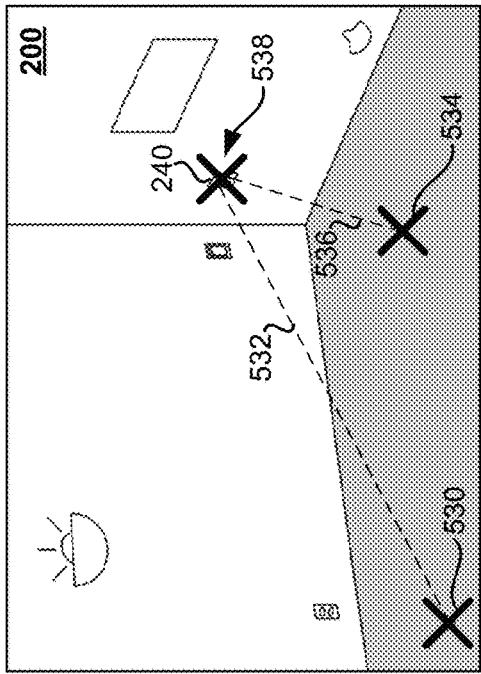
Figure 5G:
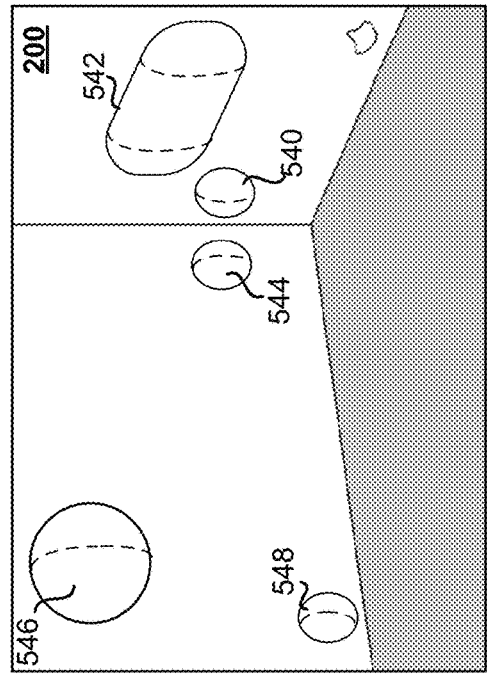

Operations of the method 400 may be repeated several times to indicate the locations of multiple controllable devices within a physical space. FIG. 5E shows an example of a first ray 532 emanating from a first location 530 and a second ray 536 emanating from a second location 534 being used to identify a coordinate 538 associated with a second target device (i.e., the controllable device 240). FIG. 5F shows the example user interface screen 520 with information entered for the controllable device 240. Also shown is the intersection volume 540 that is defined based on the selected type of controllable device at the indicated location. FIG. 5G shows an example of multiple intersections volumes for the physical space 200. In addition to the intersection volumes 540 and 546, FIG. 5G also shows intersection volumes 542, 544, and 548, which are associated with other controllable devices in the physical space 200. As can be seen, the intersections volumes may have different shapes and sizes.

Some implementations include other methods of indicating a location of a device. For example, the position of a controllable device may be determined based on a single position and orientation input (e.g., as determined using a visual positioning system) that is recorded when an image of a marker on the controllable device is captured. For example, the system may estimate a distance from a camera lens to the device when an image of a QR code is captured using image processing techniques and use that estimate in combination with the determined position and orientation of the computing device to indicate a location of the controllable device. Additionally, the position of the controllable device may be identified within an image based on identifying the location of a QR code within the image. Similarly, the position of a controllable device within an image may be identified based on detecting a blinking light within a sequence of images (i.e., a video). Some implementations include a depth-sensing camera and determine the location of the controllable device from a single location and orientation input based on the sensed depth. For example, the depth-sensing camera may include an infrared (IR) illuminator that projects an IR pattern on a target and an infrared sensor that captures the reflected IR light. Depth and surface features may be determined from the way the reflected IR light is warped. In some implementations, a single ray is used to determine the position of a target location (e.g., a controllable device) when the representation of the physical space includes a three-dimensional model of the physical space. In at least some of these implementations, a ray (e.g., determined based on the position and orientation of a mobile computing device) is projected in the representation and an intersection of the ray with the three-dimensional model is used to identify the position of the target location.

Figure 6:
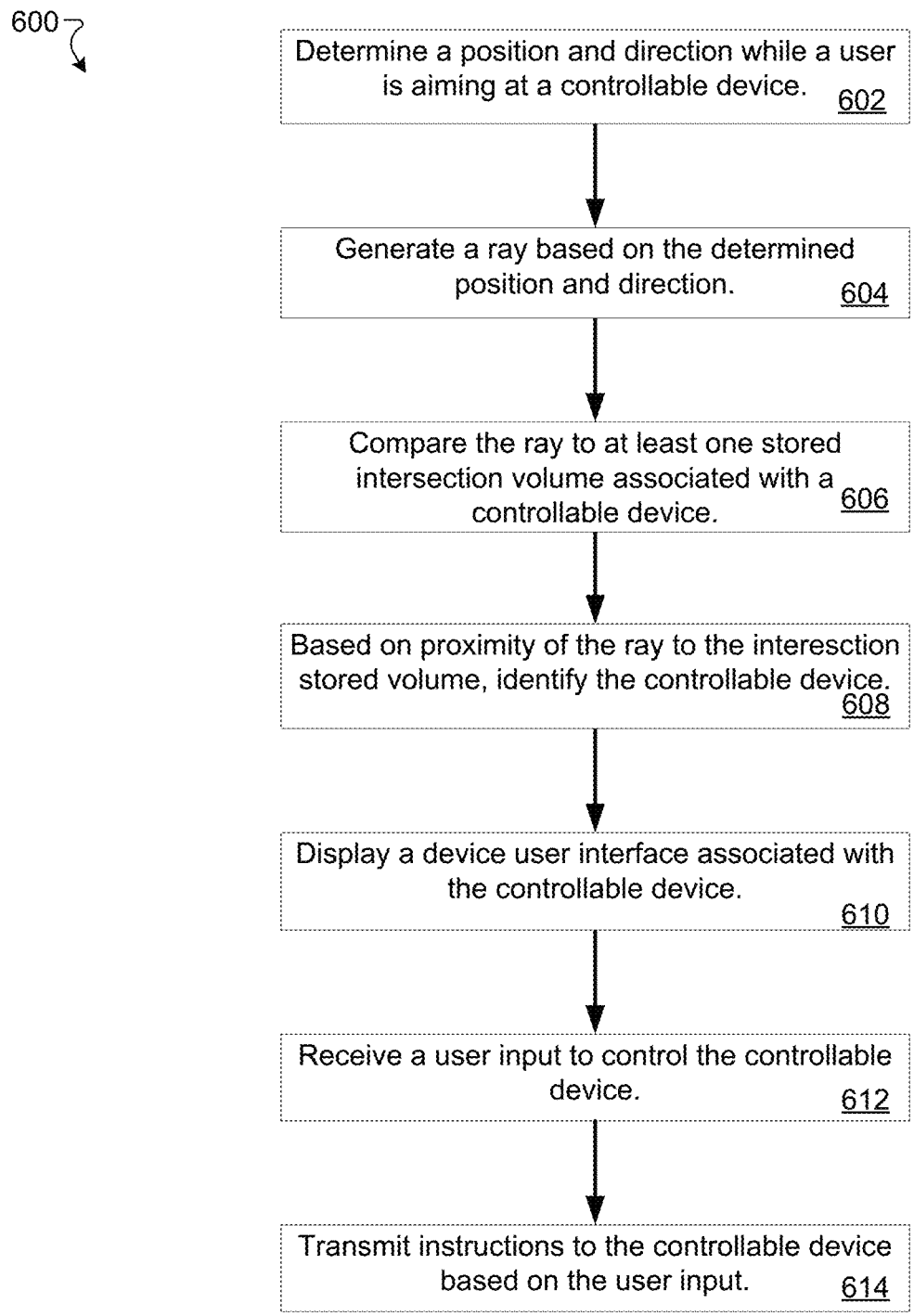
FIG. 6 is a diagram of an example method of identifying a controllable device at which a user is aiming, in accordance with implementations described herein.

FIG. 6 is a diagram of an example method 600 of identifying a controllable device at which a user is aiming, in accordance with implementations described herein. This method 600 may, for example, be performed by the device identification engine 124 of the computing device 102 to allow a user to indicate a device to control by aiming at the device.

Figure 7A:
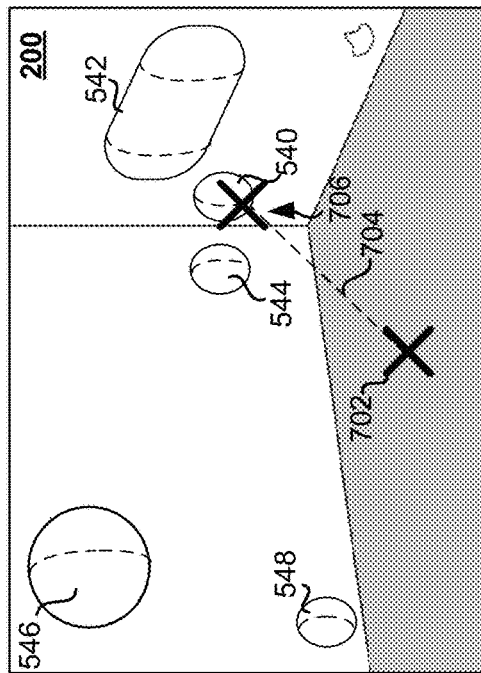
FIGS. 7A-7C are schematic diagrams of steps of identifying a controllable device at which a user is aiming in accordance with implementations as described herein.

At operation 602, a position and direction is determined while a user is aiming at a controllable device. Operation 602 may be similar to operation 302. FIG. 7A shows an example of the computing device 102 disposed at a position 702 in the physical space 200 and being aimed at the controllable device 240.

At operation 604, a ray based on the determined position and direction is generated in a representation of the physical space. For example, the ray may extend from the determined position in the determined direction. FIG. 7A shows an example ray 704 extending from the position 702.

Figure 7B:
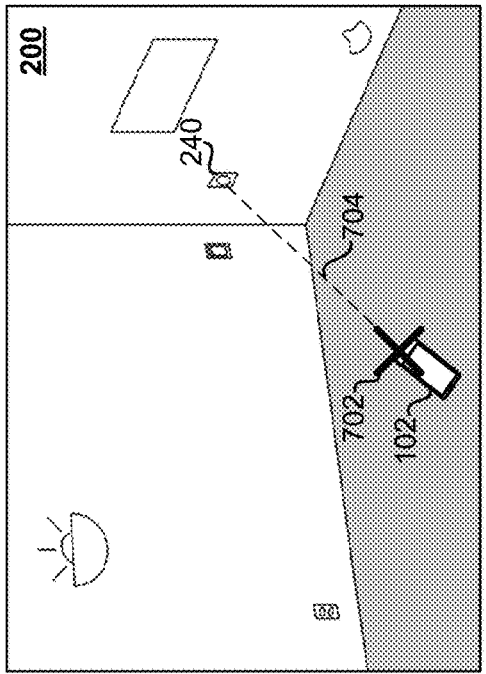

At operation 606, the ray is compared to at least one stored intersection volume associated with a controllable device. In some implementations, it is determined whether the ray intersects any of the at least one stored intersection volumes. Alternatively, it may be determined which of the at least one stored intersection volumes the ray is closest to. The stored intersection volumes may be retrieved from the memory 110 (e.g., from the device control data 128) or from a remote computing device such as the location data source 106. FIG. 7B shows an example of the ray 704 and the intersection volumes 540, 542, 544, 546, and 548. In this example, the ray 704 intersection the intersection volume 540 at an intersection point 706.

At operation 608, the controllable device that is being aimed at is identified based on proximity of the ray to the stored intersection volume. In some implementations, the controllable device is identified based on determining that the ray intersects with an intersection volume associated with the controllable device. In some implementations, the controllable device may be determined based on proximity of the ray to an associated intersection volume. In some implementations, the controllable device may be identified even when the ray does not intersect the intersection volume (e.g., if the ray passed within a predetermined threshold distance from the intersection volume or a coordinate associated with the device). In some situations, the ray may intersect with multiple intersection volumes. In this situation, some implementations may identify multiple controllable devices, which can then be presented to the user in a list. The list may be ordered based on distance to the controllable device. Some implementations may select a single one of the controllable devices based on one or more factors such as distance to the device, distance from the ray to the center of the intersection volume, etc. Some implementations also use the orientation of the computing device to determine which controllable devices to be presented (e.g., ceiling lights may only be controllable when the device is oriented upward relative to the intersection volume of the ceiling lights to prevent identification of a ceiling light on a lower level of the building).

Figure 7C:
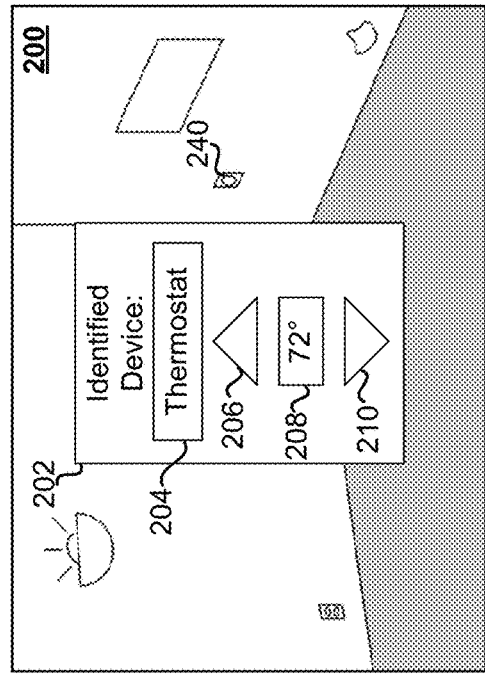

At operation 610, a device user interface associated with the controllable device is displayed. The device user interface may be specific to the identified controllable devices and may include fields for displaying and/or adjusting settings on the controllable device. FIG. 7C shows an example of a user interface screen 204 that is specific to the controllable device 240. As described previously, the user interface screen 204 includes fields to show and adjust settings of a thermostat.

At operation 612, a user input to control the identified controllable device is received. For example, a user may actuate a user interface element on the device user interface to adjust a setting of the identified controllable device or cause the controllable device to perform an action. The various types of instructions that can be performed are determined based on the type of controllable device, and in some case the access level/permissions defined for the controllable device.

At operation 614, instructions are transmitted to the controllable device based on the user input. In some implementations, the instructions are transmitted to a network address associated with the device over a wireless local area network. The instructions will be formatted according to a command protocol or application programming interface (API) associated with the controllable device. One or more of the network address, command protocol, and/or the API associated with the identified controllable device may be stored locally in the device control data 128 or may be retrieved from a remote computing device such as the location data source 106.

In some implementations, a user may select multiple controllable devices to control at the same time. For example, a user may move the computing device around to, in effect, draw a circle around a group of controllable devices. If the devices are of the same type, a single context-specific user interface screen may then be displayed through which a user could send commands to all of the devices in the group. This grouping of devices may be saved and used to later send commands to the group of devices.

Figure 8:
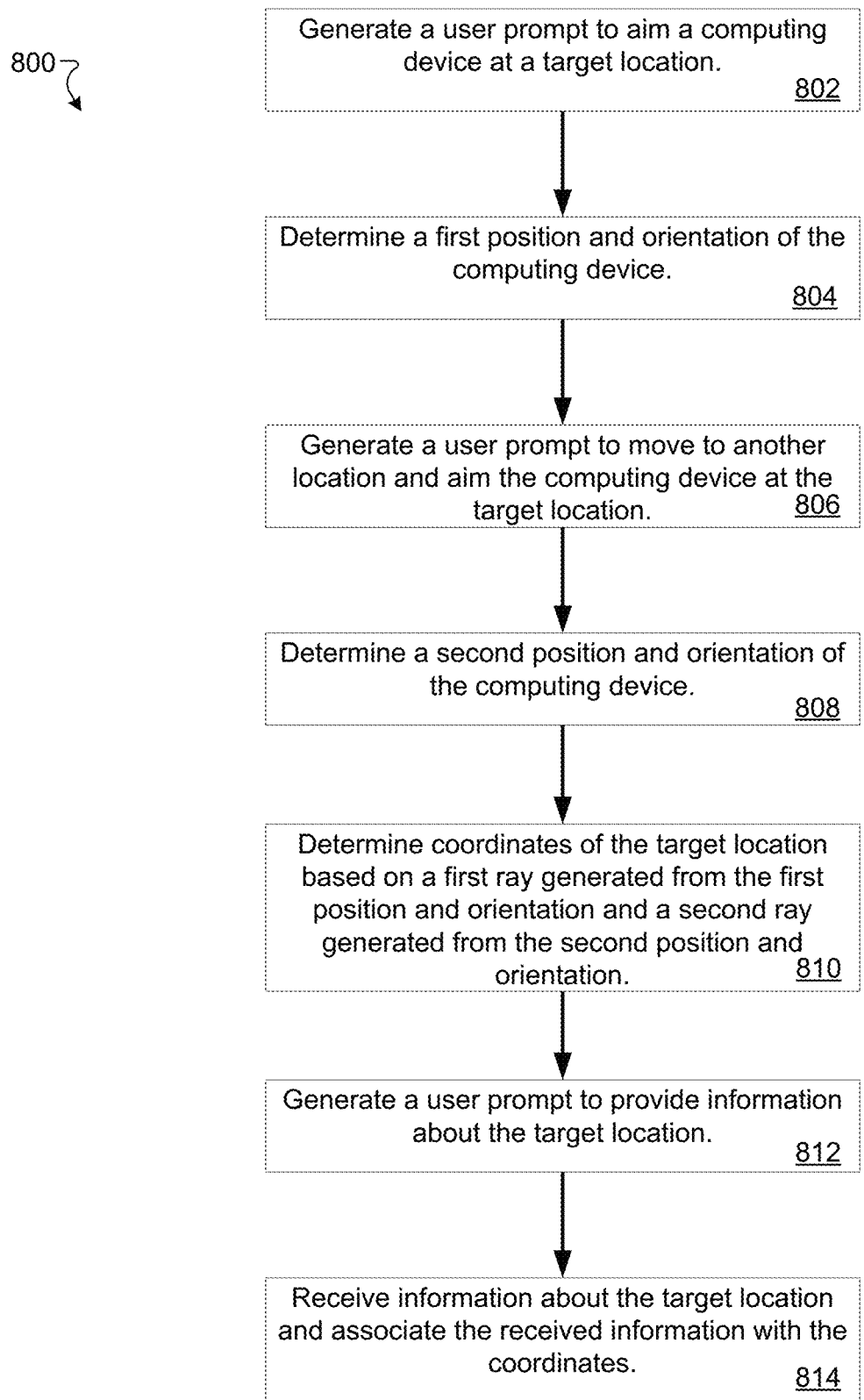
FIG. 8 is a diagram of an example method of identifying a location indicated by a user, in accordance with implementations described herein.

FIG. 8 is a diagram of an example method 800 of identifying a location indicated by a user, in accordance with implementations described herein. This method 800 may, for example, be performed by the location indication engine 122 of the computing device 102 to allow a user to indicate a location within a physical space. This method may be performed to add a note or make a maintenance request about related to the indicated location.

At operation 802, a user prompt is generated to direct a user to aim a computing device at a target location. This prompt may be similar to the previously discussed prompts such as those discussed with respect to operation 402 and may include audio and or visual components.

Figure 9A:
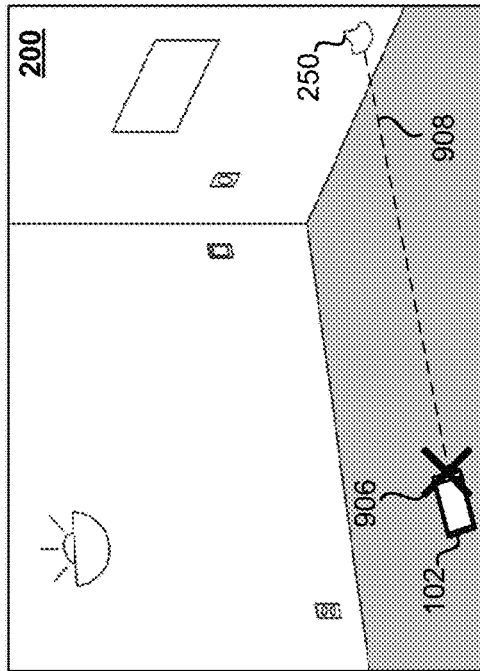
FIGS. 9A-9D are schematic diagrams of steps of identifying a location indicated by a user in accordance with implementations as described herein.

At operation 804, a first position and orientation of the computing device is determined. Operation 804 may be performed similarly to operation 404. FIG. 9A shows an example of the computing device 102 disposed at a first position 902 in the physical space 200 and being aimed at the mark 250.

At operation 806, a user prompt is generated to direct the user to move to another location and aim the computing device at the target location. This prompt may be similar to the prompt generated at operation 802.

Figure 9B:
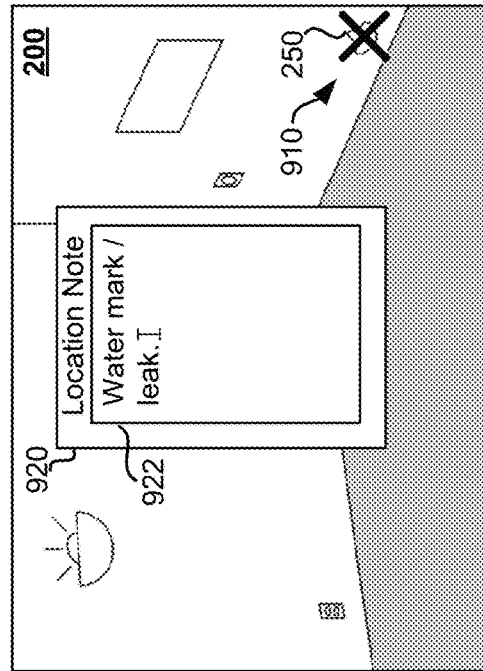

At operation 808, a second position and orientation of the computing device is determined. Operation 808 may be performed similarly to operation 804. FIG. 9B shows an example of the computing device 102 disposed at a first position 902 in the physical space 200 and being aimed at the mark 250.

Figure 9C:
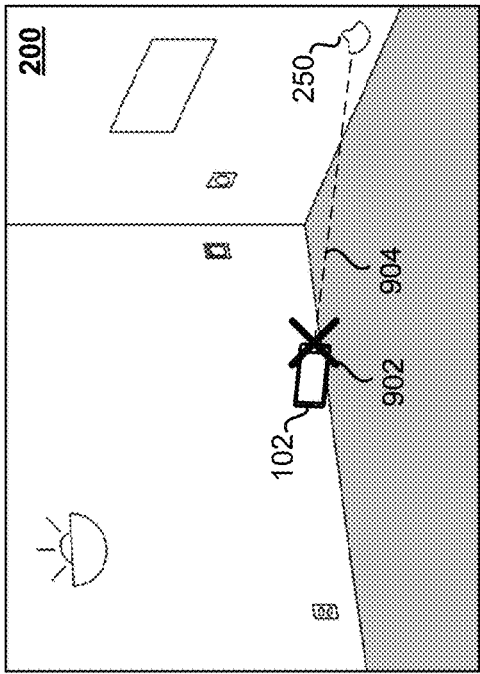

At operation 810, coordinates of the target location are determined based on a first ray generated from the first position and orientation and a second ray generated from the second position and orientation. Operation 810 may be performed similarly to operation 306. FIG. 9C shows an example of a first ray 904 and the second ray 908 being used to identify a coordinate 910 associated with the target location.

Figure 9D:
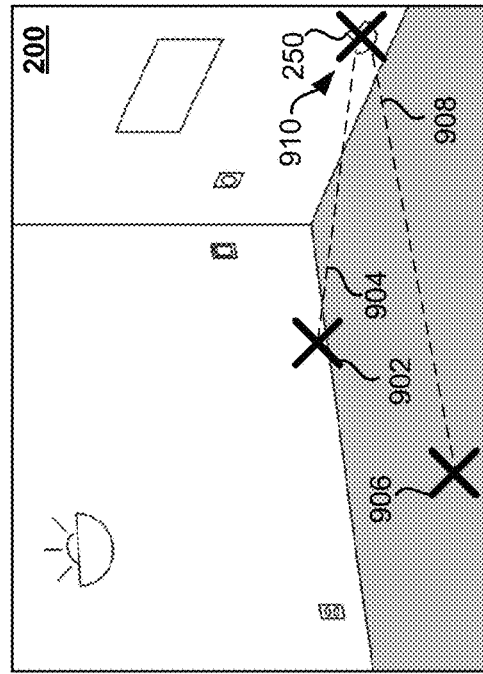

At operation 812, a user prompt is generated to request information about the target location. FIG. 9D shows an example user interface screen 920 that includes a field 922 in which a user can enter information about the indicated location. This is just an example and other implementations may include different fields. For example, in another implementation the user interface screen may include a priority field, a contact information field, or other fields.

At operation 814, information about the target location is received and associated with the coordinates of the target location. In some implementations, the information and the coordinates are stored locally on the computing device. In some implementations, the information is transmitted to a remote computing device. In some implementations, a service ticket or work order is created to track a workflow associated with the target location. In some implementations, a robotic system such as a robotic vacuum can use the location to identify and potentially remedy the issue (e.g., if the ticket relates to dirty floor). In some implementations, a request alert is generated based on the information provided by the user. The request alert may include the coordinates of the target location as well as other information provided by the user. In some implementations, the request includes a link to a record stored on the computing system. The request alert, including the customized link, may be formatted for a recipient user and transmitted to a computing device associated with that recipient. For example, the request alert may be formatted as an SMS message and then transmitted to a computing device associated with that recipient as an SMS message. When received, the request alert may cause an application on the computing device, such as a messaging application or a notification application, to open and display information about the request alert or information retrieved using the customized link.

Figure 10:
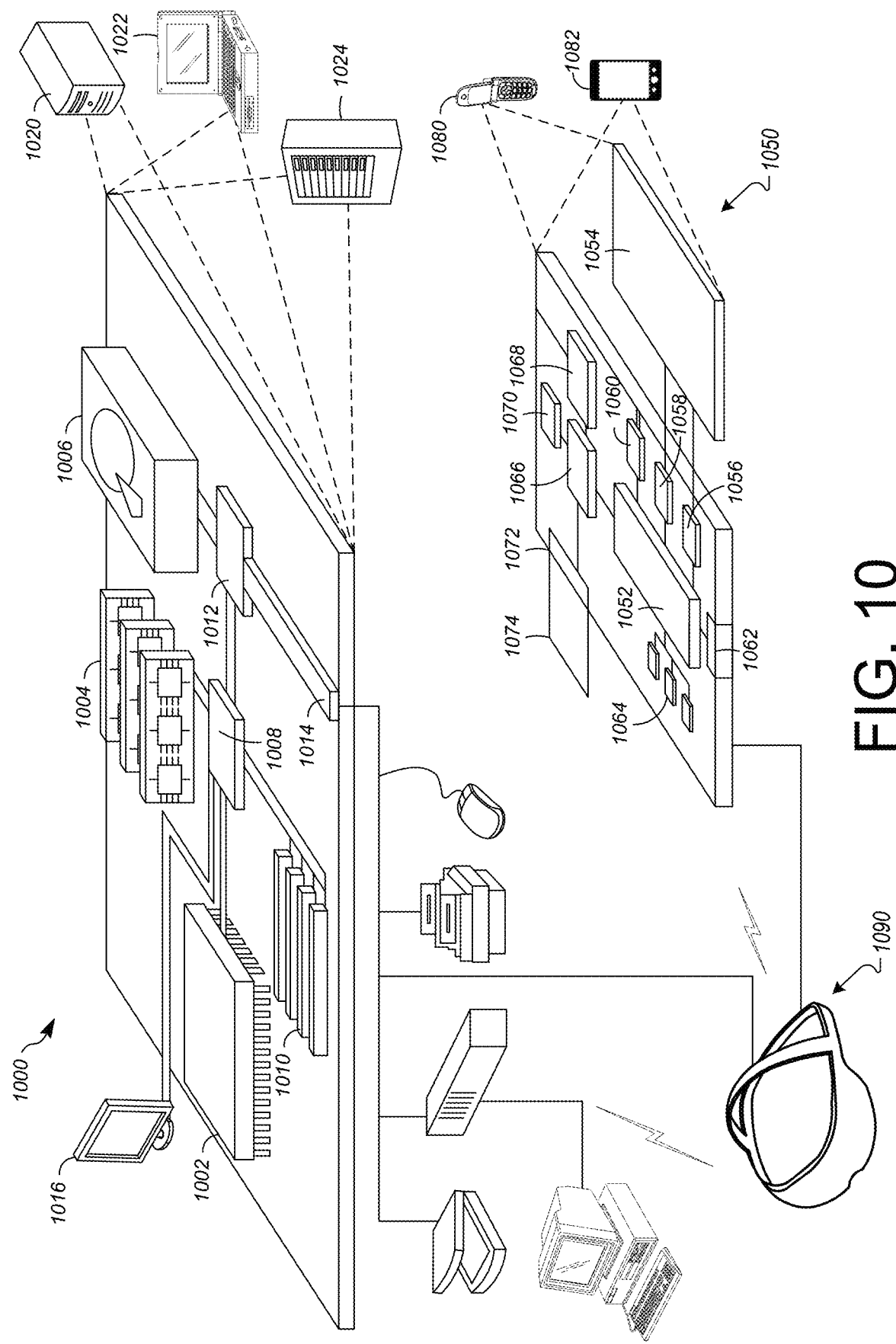
FIG. 10 shows an example of a computer device and a mobile computer device that can be used to implement the techniques described herein.

FIG. 10 shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In-Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with an AR headset/HMD device 1090 to generate an augmented environment for viewing inserted content within the physical space. For example, one or more sensors included on a computing device 1050 or other computing device depicted in FIG. 10, can provide input to the AR headset 1090 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the AR space that can then be used as input to the AR space. For example, the computing device 1050 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 1050 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the AR space can cause a particular action to occur in the AR space.

In some implementations, a touchscreen of the computing device 1050 can be rendered as a touchpad in AR space. A user can interact with the touchscreen of the computing device 1050. The interactions are rendered, in AR headset 1090 for example, as movements on the rendered touchpad in the AR space. The rendered movements can control virtual objects in the AR space.

In some implementations, one or more output devices included on the computing device 1050 can provide output and/or feedback to a user of the AR headset 1090 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the AR space. In the example of the laser pointer in an AR space, the computing device 1050 appears as a virtual laser pointer in the computer-generated, 3D environment. As the user manipulates the computing device 1050, the user in the AR space sees movement of the laser pointer. The user receives feedback from interactions with the computing device 1050 in the AR environment on the computing device 1050 or on the AR headset 1090. The user's interactions with the computing device may be translated to interactions with a user interface generated in the AR environment for a controllable device.

In some implementations, a computing device 1050 may include a touchscreen. For example, a user can interact with the touchscreen to interact with a user interface for a controllable device. For example, the touchscreen may include user interface elements such as sliders that can control properties of the controllable device.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

A first example is a non-transitory computer-readable storage medium comprising instructions stored thereon that, when executed by at least one processor, are configured to cause a computing system to: receive a representation of a three-dimensional space; determine a first position and a first orientation of a computing device based on the representation of the three-dimensional space while the computing device is aimed at a target location in the three dimensional space; determine a first ray within the representation of the three-dimensional space that extends from the first position of the computing device toward the target location based on the first position and first orientation of the computing device; determine a second position and a second orientation of the computing device based on the representation of the three-dimensional space while the computing device is aimed at the target location; determine a second ray within the representation of the three-dimensional space that extends from the second position of the computing device toward the target location based on the second position and second orientation of the computing device; determine coordinates of the target location within the three-dimensional space based on the first ray and the second ray; and update the representation of the three dimensional space to include the target location.

Implementations of the first example may include one or more of the following aspects. The instructions are further configured to cause the computing system to: prior to determining the first position, provide instructions, by the computing device, to orient the computing device with respect to the target location; and receive a user input indicating that the computing device is in the first orientation. The instructions are further configured to cause the computing system to: after determining the first position and the first orientation, provide instructions, by the computing device, to move the computing device to the second position and to orient the computing device with respect to the location; and receive a user input indicating that the computing device is in the second orientation. A direction of the first ray corresponds to a direction normal to a back surface of the computing device when the computing device is in the first orientation and a direction of the second ray corresponds to a direction normal to the back surface of the computing device when the computing device is in the second orientation. A direction of the first ray corresponds to a direction normal to a top surface of the computing device when the computing device is in the first orientation and a direction of the second ray corresponds to a direction normal to the top surface of the computing device when the computing device is in the second orientation. The instructions configured to cause the computing system to identify a location within a three-dimensional space comprise instructions configured to cause the computing system to: identify a first closest point on the first ray, the first closest point being closer to the second ray than any other points along the first ray; and determine the location based on the first closest point. The instructions configured to cause the computing system to identify a location within a three-dimensional space comprise instructions configured to cause the computing system to: identify a second closest point on the second ray, the second closest point being closer to the first ray than any other points along the second ray; and determine the location based on the first closest point and the second closest point. The instructions configured to cause the computing system to determine the location based on the first closest point and the second closest point comprise instructions configured to cause the computing system to determine a midpoint between the first closest point and the second closest point. The instructions are further configured to cause the computing system to: identify a controllable device; and associate the controllable device with the identified location in the three-dimensional space. The instructions configured to cause the computing system to identify the controllable device comprise instructions configured to cause the computing system to: present a list of controllable devices; and receive a user input selecting the controllable device from the list. The list is generated by identifying controllable devices that are available over a network. The instructions configured to cause the computing system to identify the controllable device comprise instructions configured to cause the computing system to determine a device type of the controllable device. The instructions configured to cause the computing system to identify the controllable device comprise instructions configured to cause the computing system to determine a shape associated with the controllable device. The instructions configured to cause the computing system to identify the controllable device comprise instructions configured to cause the computing system to determine a size associated with the controllable device.

The instructions configured to cause the computing system to associate the controllable device with the identified location comprise instructions configured to cause the computing system to add a record to a database. The database stores records associating a plurality of controllable devices with locations. The instructions are further configured to cause the computing system to: determine a third position and third orientation of the computing device based on the representation of the three-dimensional space while the computing device is aimed at the controllable device; determine a third ray within the representation of the three-dimensional space that extends from the third position toward the controllable device based on the third position and third orientation of the computing device; and identify the controllable device based on the third ray and the determined coordinates. The instructions are further configured to cause the computing system to display a user interface for controlling the controllable device. The instructions are further configured to cause the computing system to: receive a user input via the user interface; and responsive to receiving the user input, transmit a command to the controllable device. The command is transmitted over a wireless network. The instructions configured to cause the computing system to receive a representation of a three-dimensional space comprise instructions configured to cause the computing system to receive the representation from a memory location of the computing device. The instructions configured to cause the computing system to determine a first ray within the representation of the three-dimensional space comprise instructions configured to cause the computing system to determine an equation representing the first ray. The instructions are further configured to cause the computing system to: prior to determining a first position and orientation of the computing device: transmit an identify command to a controllable device disposed at the target location, the identify command causing the controllable device to blink a light so as to be visually identifiable; and generate a user prompt to direct a user to aim the computing device at the controllable device with the blinking light.

A second example is a computing device comprising: at least one processor; and memory storing instructions that, when executed by the at least one processor, cause the computing device to: receive a representation of a three-dimensional space; determine a position and an orientation of the computing device within the three-dimensional space while the computing device is being aimed at a controllable device; identify the controllable device based on the position, the orientation, and the representation; generate a user interface for interacting with the identified controllable device; and responsive to receiving a user input via the user interface, transmit a command to the controllable device based on the received user input.

Implementations of the second example may include one or more of the following aspects. The user interface is generated based on a type of the identified controllable device. The computing device further comprising a head-mounted display, and the first directional input corresponds to a first orientation of the head-mounted display and the second directional input corresponds to a second orientation of the head-mounted display. The head-mounted display includes a gaze tracking module, and the first directional input and the second directional input are determined using the gaze tracking module. The computing device further includes a hand tracking module, and the first directional input and the second directional input are determined using the hand tracking module. The computing device further includes a visual positioning system, and the first position and the second position are determined using the visual positioning system.

A third example is a method comprising: receiving a representation of a three-dimensional space; determining, by a computing device, a first position within the three-dimensional space; receiving, by the computing device, a first directional input that indicates a direction from the first position to a target location; determining a first ray within the representation of the three-dimensional space that extends from the first position toward the target location based on the first directional input; determining, a second position within the three-dimensional space; receiving a second directional input that indicates a direction from the second position to the target location; determining a second ray within the representation of the three-dimensional space that extends from the second position toward the target location based on the second directional input; and determining coordinates of the target location within the three-dimensional space based on the first ray and the second ray.

Implementations of the third example may include one or more of the following aspects. The first directional input is based on a first orientation of the computing device and the second directional input is based on a second orientation of the computing device. The computing device includes a head-mounted display and the first directional input corresponds to a first orientation of the head-mounted display and the second directional input corresponds to a second orientation of the head-mounted display. The computing device includes a head-mounted display with a gaze tracking module and the first directional input and the second directional input are determined using the gaze tracking module. The computing device includes a hand tracking module and the first directional input and the second directional input are determined using the hand tracking module. The computing device includes a visual positioning system and the first position and the second position are determined using the visual positioning system. Using the visual positioning system to determine the first position comprises: capturing an image while the computing device is in the first position; extracting features of the image; comparing the extracted features to stored features of the three-dimensional space; and determining the first position in the three-dimensional space based on the comparison. The method further comprising associating the determined coordinates with a request. The method further comprising: generating a request alert based on the request, wherein the request alert includes a customized link that is selectable for viewing the request and the identified location; formatting the request alert based on settings stored in a database; and transmitting the formatted request alert to a remote computing device over a network, wherein the formatted request alert includes the customized link, wherein the request alert activates an alert application on the remote computing device and causes the remote computing device to display data based on the customized link. The formatted request alert is an SMS message and the alert application is an SMS application.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A non-transitory computer-readable storage medium comprising instructions stored thereon that, when executed by at least one processor, are configured to cause a computing system to:
    receive a three-dimensional representation of a three-dimensional space;
    determine a first position and a first orientation of a computing device based on the three-dimensional representation of the three-dimensional space while the computing device is aimed at a target location in the three dimensional space;
    determine a first ray within the three-dimensional representation of the three-dimensional space that extends from the first position of the computing device toward the target location based on the first position and first orientation of the computing device;
    determine a second position and a second orientation of the computing device based on the three-dimensional representation of the three-dimensional space while the computing device is aimed at the target location;
    determine a second ray within the three-dimensional representation of the three-dimensional space that extends from the second position of the computing device toward the target location based on the second position and second orientation of the computing device;
    determine coordinates of the target location within the three-dimensional space based on the first ray and the second ray; and
    update the three-dimensional representation of the three dimensional space to include the target location.

2. The non-transitory computer-readable storage medium of claim 1 wherein the instructions are further configured to cause the computing system to:
    prior to determining the first position, generate a user prompt to direct a user to aim the computing device at the target location; and
    receive a user input indicating that the computing device is aimed at the target location.

3. The non-transitory computer-readable storage medium of claim 2, wherein the instructions are further configured to cause the computing system to:
    after determining the first position and the first orientation, generate a user prompt to direct the user to move the computing device to the second position and to aim the computing device at the target location; and
    receive a user input indicating that the computing device is in the second orientation and aimed at the target location.

4. The non-transitory computer-readable storage medium of claim 1, wherein a direction of the first ray corresponds to a direction normal to a back surface of the computing device when the computing device is in the first orientation and a direction of the second ray corresponds to a direction normal to the back surface of the computing device when the computing device is in the second orientation.

5. The non-transitory computer-readable storage medium of claim 1, wherein a direction of the first ray corresponds to a direction normal to a top surface of the computing device when the computing device is in the first orientation and a direction of the second ray corresponds to a direction normal to the top surface of the computing device when the computing device is in the second orientation.

6. The non-transitory computer-readable storage medium of claim 1, wherein the instructions configured to cause the computing system to identify a location within a three-dimensional space comprise instructions configured to cause the computing system to:
 identify a first closest point on the first ray, the first closest point being closer to the second ray than any other points along the first ray;
 identify a second closest point on the second ray, the second closest point being closer to the first ray than any other points along the second ray; and
 determine the coordinates of the target location based on the first closest point and the second closest point.

7. The non-transitory computer-readable storage medium of claim 1, wherein the instructions are further configured to cause the computing system to:
 identify a controllable device; and
 associate the controllable device with the coordinates of the target location in the three-dimensional space.

8. The non-transitory computer-readable storage medium of claim 7, wherein the instructions configured to cause the computing system to identify the controllable device comprise instructions configured to cause the computing system to:
 present a list of controllable devices; and
 receive a user input selecting the controllable device from the list.

9. The non-transitory computer-readable storage medium of claim 7, wherein the instructions configured to cause the computing system to identify the controllable device comprise instructions configured to cause the computing system to determine a device type of the controllable device.

10. The non-transitory computer-readable storage medium of claim 7, wherein the instructions configured to cause the computing system to identify the controllable device comprise instructions configured to cause the computing system to determine a size associated with the controllable device.

11. The non-transitory computer-readable storage medium of claim 7, wherein the instructions configured to cause the computing system to update the three-dimensional representation of the three dimensional space to include the target location comprise instructions configured to cause the computing system to add a record to a database, wherein the database stores records associating a plurality of controllable devices with locations.

12. The non-transitory computer-readable storage medium of claim 7, wherein the instructions are further configured to cause the computing system to:
 determine a third position and third orientation of the computing device based on the three-dimensional representation of the three-dimensional space while the computing device is aimed at the controllable device;
 determine a third ray within the three-dimensional representation of the three-dimensional space that extends from the third position toward the controllable device based on the third position and third orientation of the computing device;
 identify the controllable device based on the third ray and the determined coordinates; and
 display a user interface for controlling the controllable device.

13. The non-transitory computer-readable storage medium of claim 12, wherein the instructions are further configured to cause the computing system to:
 receive a user input via the user interface; and
 responsive to receiving the user input, transmit a command to the controllable device.

14. The non-transitory computer-readable storage medium of claim 1, wherein the instructions are further configured to cause the computing system to:
 prior to determining a first position and orientation of the computing device:
  transmit an identify command to a controllable device disposed at the target location, the identify command causing the controllable device to blink a light so as to be visually identifiable; and
  generate a user prompt to direct a user to aim the computing device at the controllable device with the blinking light.

15. The non-transitory computer-readable storage medium of claim 1, wherein the instructions are further configured to cause the computing system to:
 determine a third position and a third orientation of the computing device based on the three-dimensional representation of the three-dimensional space while the computing device is aimed at the target location; and
 determine a third ray within the three-dimensional representation of the three-dimensional space that extends from the third position of the computing device toward the target location based on the third position and third orientation of the computing device; and
 wherein the instructions configured to cause the computing system to determine coordinates of the target location cause the computing system to determine coordinates of the target location within the three-dimensional space based on the first ray, the second ray, and the third ray.

16. The non-transitory computer-readable storage medium of claim 1, wherein the three-dimensional representation is a three-dimensional map layer.

17. A computing device comprising:
 at least one processor; and
 memory storing instructions that, when executed by the at least one processor, cause the computing device to:
  receive a three-dimensional representation of a three-dimensional space;
  determine a position and an orientation of the computing device within the three-dimensional space while the computing device is aimed at a controllable device previously added to the three-dimensional representation of the three-dimensional space;
  identify the controllable device based on the position, the orientation, and the three-dimensional representation of the three-dimensional space;
  generate a user interface for interacting with the identified controllable device; and
  responsive to receiving a user input via the user interface, transmit a command to the controllable device based on the received user input.

18. The computing device of claim 17, wherein the user interface is generated based on a type of the identified controllable device.

19. The computing device of claim 17 further comprising a head-mounted display, wherein a first directional input corresponds to a first orientation of the head-mounted display and a second directional input corresponds to a second orientation of the head-mounted display.

20. The computing device of claim 17 further comprising a head-mounted display, wherein the head-mounted display includes a gaze tracking module, and a first directional input and a second directional input are determined using the gaze tracking module.

21. The computing device of claim 17 further comprising a hand tracking module, wherein a first directional input and a second directional input are determined using the hand tracking module.

22. The computing device of claim 17 further comprising a visual positioning system, wherein a first position and a second position are determined using the visual positioning system.

23. A method comprising:
receiving a three-dimensional representation of a three-dimensional space;
determining, by a computing device, a first position within the three-dimensional space;
receiving, by the computing device, a first directional input that indicates a direction from the first position to a target location;
determining a first ray within the three-dimensional representation of the three-dimensional space that extends from the first position toward the target location based on the first directional input;
determining, a second position within the three-dimensional space;
receiving a second directional input that indicates a direction from the second position to the target location;
determining a second ray within the three-dimensional representation of the three-dimensional space that extends from the second position toward the target location based on the second directional input; and
determining coordinates of the target location within the three-dimensional space based on the first ray and the second ray.

24. The method of claim 23, wherein the first directional input is based on a first orientation of the computing device and the second directional input is based on a second orientation of the computing device.

25. The method of claim 23, further comprising:
capturing an image while the computing device is in the first position;
extracting features of the image;
comparing the extracted features to stored features of the three-dimensional space; and
determining the first position in the three-dimensional space based on the comparison.

26. The method of claim 23, further comprising:
associating the determined coordinates with a request;
generating a request alert based on the request; and
transmitting the request alert to a computing device over a network.

27. A non-transitory computer-readable storage medium comprising instructions stored thereon that, when executed by at least one processor, are configured to cause a computing system to:
receive a representation of a three-dimensional space;
determine a first position and a first orientation of a computing device based on the representation of the three-dimensional space while the computing device is aimed at a target location in the three dimensional space;
determine a first ray within the representation of the three-dimensional space that extends from the first position of the computing device toward the target location based on the first position and first orientation of the computing device;
determine a second position and a second orientation of the computing device based on the representation of the three-dimensional space while the computing device is aimed at the target location;
determine a second ray within the representation of the three-dimensional space that extends from the second position of the computing device toward the target location based on the second position and second orientation of the computing device;
determine coordinates of the target location within the three-dimensional space based on the first ray and the second ray;
update the representation of the three dimensional space to include the target location; and
identify a controllable device; and
associate the controllable device with the coordinates of the target location in the three-dimensional space.

* * * * *